United States Patent [19]

Miyake et al.

[11] Patent Number: 5,182,153
[45] Date of Patent: Jan. 26, 1993

[54] FLEXIBLE MAGNETIC DISC

[75] Inventors: Akira Miyake, Mishima; Yoshinori Yamamoto, Takatsuki, both of Japan

[73] Assignee: Hitachi Maxell, Ltd., Osaka, Japan

[21] Appl. No.: 376,509

[22] Filed: Jul. 7, 1989

[30] Foreign Application Priority Data

Jul. 13, 1988 [JP] Japan ................. 63-174635

[51] Int. Cl.⁵ .................. G11B 23/00; B05D 5/12; C23C 14/00; B32B 3/02
[52] U.S. Cl. ........................ 428/64; 428/65; 428/480; 428/900; 428/323; 428/423.7; 428/694; 427/129; 204/192.2
[58] Field of Search ........... 428/480, 694, 900, 64, 428/65, 323, 423.7; 427/129; 204/192.2

[56] References Cited

U.S. PATENT DOCUMENTS

| | | | |
|---|---|---|---|
| 4,270,412 | 6/1981 | Katoh et al. | 428/480 |
| 4,275,107 | 6/1981 | Bartkus et al. | 428/220 |
| 4,481,231 | 11/1984 | Hashimoto et al. | 427/128 |
| 4,652,479 | 3/1987 | Suzuki et al. | 428/64 |
| 4,680,197 | 7/1987 | Sagoi et al. | 204/192.2 |
| 4,728,577 | 3/1988 | Yamada et al. | 428/480 |
| 4,780,353 | 10/1988 | Takahashi et al. | 428/480 |
| 4,801,481 | 1/1989 | Sagoi et al. | 428/64 |

OTHER PUBLICATIONS

Patent Abstracts of Japan vol. 11, No. 274 (P-612) Sep. 5, 1987, and JP-A-62 073420 (Teijin Ltd.) Apr. 4, 1987, Abstract only.
Patent Abstracts of Japan vol. 12, No. 343 (M-741) Sep. 14, 1988, and JP-A-63 104822 (Toray Ind Inc) May 10, 1988, Abstract only.
Patent Abstracts of Japan vol. 11, No. 079 (P-555) Mar. 11, 1987, and JP-A-61 236021 (Diafoil Co Ltd) Oct. 21, 1986, Abstract only.
Patent Abstracts of Japan vol. 9, No. 076 (P-346) Apr. 5, 1985, and JP-A-59 207022 (Toray KK) Nov. 24, 1984, Abstract only.
Patent Abstracts of Japan vol. 10, No. 088 (M-467) Apr. 5, 1986, and JP-A-60 228128 (Teijin KK) Nov. 13, 1985, Abstract only.
Patent Abstracts of Japan, vol. 11, No. 253 (P-606) Aug. 18, 1987, and JP-A-62-060120 (Teijin Ltd) Mar. 16, 1987, Abstract only.
Patent Abstracts of Japan vol. 11, No. 287 (P-617) Sep. 17, 1987, and JP-A-62 084424 (Teijin Ltd) Apr. 17, 1987, Abstract only.
Patent Abstracts of Japan vol. 10, No. 298 (P-505) Oct. 9, 1986, and JP-A-61 115231 (Nissin Electric Co. Ltd) Jun. 2, 1986, Abstract only.

*Primary Examiner*—P. C. Sluby
*Assistant Examiner*—Leszek Kiliman
*Attorney, Agent, or Firm*—Birch, Stewart, Kolasch & Birch

[57] ABSTRACT

A magnetic disc comprising a nonmagnetic substrate made of a synthetic resin film and at least one magnetic layer on the surface of the substrate has improved reliability when it having a dimensional shrinkage factor of not more than 0.04% in a radial direction after keeping the magnetic disc at 60° C., 90% RH for 64 hours and then keeping it at room temperature for 72 hours.

6 Claims, No Drawings

FLEXIBLE MAGNETIC DISC

BACKGROUND OF THE INVENTION

1. Field of the Invention

The present invention relates to a flexible magnetic disc having an improved dimensional shrinkage factor.

2. Description of the Related Art

A conventional flexible magnetic disc is produced by blanking a disc from a polyethylene terephthalate film of about 75 $\mu$m in thickness both surfaces of which are coated with magnetic layers of 0.5 to 3.0 $\mu$m in thickness. Since the polyethylene terephthalate film used as a substrate is hot stretched during the film production and further it is under tension during the production from the magnetic film, the film suffers from heat shrinkage when heated. Accordingly, when signals are recorded on the magnetic disc at the lower temperature, the magnetic disc is stored at a higher temperature and then the recorded signals are reproduced at a lower temperature, the degree of off-track of a magnetic head becomes large during reproduction because of heat shrinkage of the magnetic disc. Particularly, in the case of the flexible magnetic disc having a large tracking density, off-track causes errors.

SUMMARY OF THE INVENTION

An object of the present invention is to provide a flexible magnetic disc having a reduced shrinkage factor so that the possibility of error is reduced even when the track density is large.

Accordingly, the present invention provides a magnetic disc comprising a nonmagnetic substrate made of a synthetic resin film and at least one magnetic layer on the surface of the substrate, which magnetic disc has a dimensional shrinkage factor of not more than 0.04% in a radial direction after keeping the magnetic disc at 60° C., and 90% RH for 64 hours and then maintaining the magnetic disc at room temperature for 72 hours.

DETAILED DESCRIPTION OF THE INVENTION

The present invention has been completed based on the finding that heat shrinkage can be prevented when the synthetic resin film having the magnetic layer is blanked to produce the magnetic disc after thoroughly shrinking the film.

When the synthetic resin film is shrunk before the formation of the magnetic layer and the magnetic layer is formed on the shrunken film, the magnetic film is stretched by tension and heat generated during the production of the magnetic film, for example, in the formation of the magnetic layer. Then, the magnetic disc shrinks during storage at high temperature.

When the flexible magnetic disc is supplied in the form of a floppy disc having a rigid case for containing the disc, such as a 3.5 inch type floppy disc, a hub is adhered to the periphery of a center hole. In such a case, the shrinkage treatment is preferably done before the adhesion of the hub to achieve the flatness of the disc plane. Then, the substrate film is preferably shrunk after formation of the magnetic layer and before assembling the disc.

The magnetic film can be shrunk by various methods. For example, the film is heated for at least 10 hours without tension at a temperature higher than a temperature at which the magnetic disc will be stored. Alternatively, the film is irradiated with an electron beam to a dose of at least 8 Mrad.

The synthetic resin film and the magnetic layer may be selected from conventionally used resin films and magnetic layers.

Except for the shrinkage treatment, the magnetic disc of the present invention can be produced by a conventional method.

PREFERRED EMBODIMENTS OF THE INVENTION

The present invention will be illustrated by following Examples, in which "parts" are by weight unless otherwise indicated.

In the Examples, magnetic films before heat shrinkage were produced by the following procedures:

Preparation of Magnetic Film

The following components were well kneaded and dispersed for 120 hours in a ball mill:

| Component | Parts |
| --- | --- |
| Co-containing $\gamma$-Fe$_2$O$_3$ | 100 |
| Nitrocellulose resin (HC 100 manufactured by Daicel) | 15.6 |
| Polyurethane resin (H1 2000 manufactured by Dainippon Ink) | 15.6 |
| $\alpha$-Al$_2$O$_3$ (average particle size, 0.4 $\mu$m) | 10 |
| Oleyl oleate | 10 |
| Butylcellosolve stearate | 1 |
| Cyclohexanone | 140 |
| Toluene | 140 |

Then, to the mixture, a polyisocyanate compound (Colonate L manufactured by Nippon Polyurethane) (7.8 parts) was added and mixed for one hour to prepare a magnetic paint. The magnetic paint was coated on both surfaces of a polyethylene terephthalate film having a thickness of 75 $\mu$m and dried to form magnetic layers each having a thickness of 1.2 $\mu$m followed by surface treatment by calendering.

EXAMPLE 1

The magnetic film was heated at 80° C. for 16 hours without tension and blanked to form a doughnut shape flexible magnetic disc having an outer diameter of 130.2 mm and an inner diameter of 28.6 mm.

EXAMPLE 2

After the magnetic film was irradiated with an electron beam to a dose of 12 Mrad while running, it was blanked in the same manner as in Example 1 to produce a flexible magnetic disc.

EXAMPLE 3

After the magnetic film was dried at 80° C. and immediately irradiated with an electron beam to a dose of 8 Mrad while running, it was blanked in the same manner as in Example 1 to produce a flexible magnetic disc.

COMPARATIVE EXAMPLE 1

After the magnetic film was heated at 80° C. for 16 hours under tension, it was blanked in the same manner as in Example 1 to produce a flexible magnetic disc.

COMPARATIVE EXAMPLE 2

The magnetic film as prepared was blanked in the same manner as in Example 1 to produce a flexible magnetic With each of the magnetic discs produced in Examples and Comparative Examples, a degree of heat shrinkage and decrease of output on the outermost track were measured as follows:

HEAT SHRINKAGE

The magnetic disc is kept at 60° C., 90% RH for 64 hours and then kept at room temperature for 72 hours. Then, the degree of shrinkage is measured on 18 different diameters each pair of the adjacent diameters deviate by an angle of 10 degree from each other. The maximum degree of shrinkage is defined as the degree of heat shrinkage of the magnetic disc. Also the heat shrinkage factor (%) is calculated.

Decrease of Output

On the magnetic disc, a standard signal is recorded on a track at a diameter of 57.15 mm with a track width of 165 $\mu$m at a track density of 96 TPI and reproducing output is measured. Then, the recorded magnetic disc is thermally treated under the same condition as in the measurement of heat shrinkage and again the reproducing output on the track at a diameter of 57.15 mm is measured. The difference of the output between before and after heat shrinkage is calculated. The difference is a criteria for influence of the heat shrinkage on reliability of the magnetic disc in use.

The results are shown in Table.

TABLE

| Example No. | Degree of Heat shrinkage ($\mu$m) | Heat shrinkage factor (%) | Decrease of output (dB) |
| --- | --- | --- | --- |
| 1 | 20 | 0.015 | −0.5 |
| 2 | 35 | 0.027 | −0.9 |
| 3 | 30 | 0.023 | −0.7 |
| Comp. 1 | 180 | 0.138 | −5.6 |
| Comp. 2 | 220 | 0.170 | −7.5 |

As understood from the above, when the magnetic disc has a heat shrinkage factor of no greater than 0.04%, decrease of the output is small even on the outermost track which receives the largest influence of the heat shrinkage, so that the magnetic disc has no or few errors and improved reliability.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A flexible magnetic disc comprising a non-magnetic substrate consisting of a polyethylene terephthalate film and at least one magnetic layer which comprises a magnetic powder and a binder comprising a polyurethane resin and a polyisocyanate on at least one surface of said film substrate, which flexible magnetic disc is shrunk after formation of said magnetic layer and before blanking, such that it has a dimensional shrinkage factor of not more than 0.04% in a radial direction measured after said magnetic disc has been first kept at 60° C., and 90% RH for 64 hours and then maintained at room temperature for 72 hours.

2. The flexible magnetic disc according to claim 1, wherein said magnetic layer is painted on both surfaces of said substrate.

3. A flexible magnetic disc comprising a non-magnetic substrate consisting of a polyethylene terephthalate film and at least one magnetic layer which comprises a magnetic powder and a binder comprising a polyurethane resin and a polyisocyanate painted on at least one surface of said film substrate prepared according to the process of coating said magnetic layer on at least one surface of said polyethylene terephthalate film to produce a magnetic film, heating said magnetic film for at least 10 hours in the absence of tension at a temperature higher than a temperature at which said magnetic disc would be stored thereby thoroughly shrinking said magnetic film, and blanking said film to produce said magnetic disc having a dimensional shrinkage factor of not more than 0.04% in a radial direction measured after said magnetic disc has been first kept at 60° C., and 90% RH for 64 hours and then maintained at room temperature for 72 hours.

4. The flexible magnetic disc of claim 3, wherein said magnetic film is heated at 80° C. for 16 hours in the absence of tension.

5. A flexible magnetic disc comprising a non-magnetic substrate consisting of a polyethylene terephthalate film and at least one magnetic layer painted on at least one surface of said film substrate prepared according to the process of coating said magnetic layer on at least one surface of said polyethylene terephthalate film to produce a magnetic film, exposing said film to radiation with an electron beam prior to blanking, thereby thoroughly shrinking said magnetic film, and blanking said film to produce said magnetic disc having a dimensional shrinkage factor of not more than 0.04% in a radial direction measured after said magnetic disc has been first kept at 60° C., and 90% RH for 64 hours and then maintained at room temperature for 72 hours.

6. The flexible magnetic disc of claim 5, wherein said electron beam is at least 8 Myrad.

* * * * *